: US009542937B2

United States Patent
Nakadai et al.

(10) Patent No.: US 9,542,937 B2
(45) Date of Patent: Jan. 10, 2017

(54) SOUND PROCESSING DEVICE AND SOUND PROCESSING METHOD

(71) Applicant: HONDA MOTOR CO., LTD., Tokyo (JP)

(72) Inventors: Kazuhiro Nakadai, Wako (JP); Keisuke Nakamura, Wako (JP); Daisuke Kimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 233 days.

(21) Appl. No.: 14/148,813

(22) Filed: Jan. 7, 2014

(65) Prior Publication Data

US 2014/0200887 A1 Jul. 17, 2014

(30) Foreign Application Priority Data

Jan. 15, 2013 (JP) ................................. 2013-004626

(51) Int. Cl.
*G10L 15/00* (2013.01)
*G10L 15/20* (2006.01)
*H04B 15/00* (2006.01)
*G10L 21/0208* (2013.01)

(52) U.S. Cl.
CPC ............ *G10L 15/20* (2013.01); *G10L 21/0208* (2013.01)

(58) Field of Classification Search
CPC ........... G10L 15/00; G10L 15/20; H04B 15/00
USPC ................................. 704/233, 251; 381/94.3
See application file for complete search history.

(56) References Cited

U.S. PATENT DOCUMENTS

| 6,868,378 B1* | 3/2005 | Breton .................... G10L 15/20 381/71.1 |
| 8,744,844 B2* | 6/2014 | Klein .................. G10L 21/0208 704/226 |
| 2008/0071540 A1* | 3/2008 | Nakano .................. G10L 15/20 704/251 |
| 2009/0030679 A1* | 1/2009 | Chengalvarayan ..... G10L 15/20 704/233 |

(Continued)

FOREIGN PATENT DOCUMENTS

| JP | 2010-271411 A | 12/2010 |
| JP | 5041934 B2 | 10/2012 |

OTHER PUBLICATIONS

Barker et al., "Robust ASR based on clean speech models: an evaluation of missing data techniques for connected digit recognition in noise." INTERSPEECH. 2001.*

*Primary Examiner* — Pierre-Louis Desir
*Assistant Examiner* — Seong Ah A Shin
(74) *Attorney, Agent, or Firm* — Squire Patton Boggs (US) LLP

(57) ABSTRACT

A sound processing device includes a noise suppression unit configured to suppress a noise component included in an input sound signal, an auxiliary noise addition unit configured to add auxiliary noise to the input sound signal, whose noise component has been suppressed by the noise suppression unit, to generate an auxiliary noise-added signal, a distortion calculation unit configured to calculate a degree of distortion of the auxiliary noise-added signal, and a control unit configured to control an addition amount by which the auxiliary noise addition unit adds the auxiliary noise based on the degree of distortion calculated by the distortion calculation unit.

5 Claims, 9 Drawing Sheets

(56) References Cited

U.S. PATENT DOCUMENTS

| | | | |
|---|---|---|---|
| 2010/0131269 A1* | 5/2010 | Park | G10K 11/178 |
| | | | 704/233 |
| 2011/0211711 A1* | 9/2011 | Inoue | G10L 21/02 |
| | | | 381/94.3 |
| 2011/0224980 A1* | 9/2011 | Nakadai | G10L 15/20 |
| | | | 704/233 |
| 2012/0173234 A1* | 7/2012 | Fujimoto | G10L 15/20 |
| | | | 704/233 |
| 2012/0209611 A1* | 8/2012 | Furuta | G10L 21/038 |
| | | | 704/268 |
| 2013/0260692 A1* | 10/2013 | Hera | H04M 1/6083 |
| | | | 455/63.1 |
| 2014/0177868 A1* | 6/2014 | Jensen | H04R 3/002 |
| | | | 381/94.7 |

* cited by examiner

SOUND PROCESSING DEVICE AND SOUND PROCESSING METHOD

CROSS REFERENCE TO RELATED APPLICATIONS

Priority is claimed on Japanese Patent Application No. 2013-004626, filed on Jan. 15, 2013, the contents of which are entirely incorporated herein by reference.

BACKGROUND OF THE INVENTION

Field of the Invention

The present invention relates to a sound processing device and a sound processing method.

Description of Related Art

It is known that a speech recognition rate is lowered when speech is recognized in a noisy environment. It has been proposed that the lowering of a speech recognition rate is suppressed by suppressing background noise included in an input sound signal has been proposed.

Since suppression of background noise causes distortion in a component of speech uttered by a person, a speech recognition rate may not be satisfactorily raised or the speech recognition rate may rather be lowered. In this regard, for example, Japanese Patent No. 5041934 (Patent Document 1) discloses a process of adding white noise to a sound signal whose noise has been suppressed to reduce an influence of distortion. In the process disclosed in Patent Document 1, the influence of distortion due to suppression of noise may be alleviated to raise the speech recognition rate by increasing an addition amount of white noise.

However, since the addition of white noise relatively decreases a speech component, the speech recognition rate may be lowered.

On the other hand, for example, Japanese Unexamined Patent Application, First Publication No. 2010-271411 (Patent Document 2) discloses a noise suppression device that includes first noise suppression means for extracting noise components from sound signals of multiple channels, estimating stationary noise included in the noise components, and subtracting a spectrum of the stationary noise from spectrums of the sound signals of the channels based on a subtraction coefficient. The noise suppression device estimates a spectrum of non-stationary noise by subtracting the spectrum of stationary noise from the spectrums of the noise components of the channels and generates a filter coefficient for emphasizing a target sound component from the spectrum of non-stationary noise. The noise suppression device also includes second noise suppression means for performing a filtering process using the filter coefficient on the sound signals of multiple channels having been processed by the first noise suppression means. The noise suppression device calculates a kurtosis variation index indicating a degree by which a kurtosis in a frequency distribution of intensity of the sound signals varies before being processed by the first noise suppression means and after being processed by the second noise suppression means and variably controls a subtraction coefficient based on the calculated kurtosis variation index.

However, the noise suppression device disclosed in Patent Document 2 determines a spectrum subtraction coefficient based on the kurtosis variation index as an index of a directivity difference between a target sound and noise and suppresses the background noise included in the sound signals of multiple channels, and thus the processing load thereof is excessively large. Therefore, the speech recognition rate could not be enhanced through the use of a process with a relatively small load, such as the process of adding auxiliary noise such as white noise in the sound processing device disclosed in Japanese Patent No. 5041934.

SUMMARY OF THE INVENTION

The present invention was made in consideration of the above-mentioned situations and an object thereof is to provide a sound processing device and a sound processing method which can enhance a speech recognition rate by adding auxiliary noise.

(1) In order to achieve the above-mentioned object, according to an aspect of the invention, there is provided a sound processing device including: a noise suppression unit configured to suppress a noise component included in an input sound signal; an auxiliary noise addition unit configured to add auxiliary noise to the input sound signal, whose noise component has been suppressed by the noise suppression unit, to generate an auxiliary noise-added signal; a distortion calculation unit configured to calculate a degree of distortion of the auxiliary noise-added signal; and a control unit configured to control an addition amount by which the auxiliary noise addition unit adds the auxiliary noise based on a degree of distortion calculated by the distortion calculation unit.

(2) In the sound processing device according to another aspect of the invention, the control unit may be configured to estimate a speech recognition rate based on the auxiliary noise-added signal and to control the addition amount of the auxiliary noise so as to maximize the estimated speech recognition rate.

(3) In the sound processing device according to another aspect of the invention, the control unit may be configured to estimate the speech recognition rate based on the degree of distortion of the auxiliary noise-added signal generated by suppressing the noise component with at least two types of suppression amounts, to select the suppression amount with which the estimated speech recognition rate is maximized, and to cause the noise suppression unit to suppress the noise component with the selected suppression amount.

(4) In the sound processing device according to another aspect of the invention, the control unit may be configured to control the addition amount of the auxiliary noise so as to maximize the estimated speech recognition rate with the selected suppression amount.

(5) In the sound processing device according to another aspect of the invention, the distortion calculation unit may be configured to calculate a kurtosis ratio which is a ratio of a kurtosis of the auxiliary noise-added signal to a kurtosis of the input sound signal as the degree of distortion.

(6) The sound processing device according to another aspect of the invention may further include a speech recognition unit configured to perform a speech recognition process on the auxiliary noise-added signal, the distortion calculation unit may be configured to calculate the degree of distortion for each component of the auxiliary noise-added signal, and the speech recognition unit may be configured to perform the speech recognition process so that the larger the degree of distortion of a component becomes, the smaller an influence of the component becomes.

(7) According to another aspect of the invention, there is provided a sound processing method including: a noise suppression step of detecting a noise component included in an input sound signal and suppressing the noise component detected from the input sound signal; an auxiliary noise addition step of adding auxiliary noise to the input sound signal, whose noise component has been suppressed in the noise suppression step, to generate an auxiliary noise-added signal; a distortion calculation step of calculating a degree of distortion of the auxiliary noise-added signal; and a control step of controlling an addition amount by which the auxiliary noise is added in the auxiliary noise addition step based on the degree of distortion calculated in the distortion calculation step.

According to the aspects of (1) and (7), the auxiliary noise is added to the sound signal, whose noise component has been suppressed, with an addition amount corresponding to the degree of distortion of speech based on the suppression of noise to alleviate the distortion. Accordingly, it is possible to enhance the speech recognition rate with a relatively-small processing load by using the auxiliary noise-added signal, which has been acquired according to the aspects, for the speech recognition process.

According to the aspect of (2), since the addition amount of the auxiliary noise is determined to maximize the speech recognition rate, it is possible to further enhance the speech recognition rate.

According to the aspect of (3), it is possible to further enhance the speech recognition rate by reducing the influence of distortion due to the suppression of the noise component.

According to the aspect of (4), it is possible to calculate the addition amount of the auxiliary noise having a smaller influence to the speech recognition rate by alleviating the influence of distortion.

According to the aspect of (5), since the kurtosis of the auxiliary noise-added signal as an index of the degree of distortion is normalized with the kurtosis of the input sound signal, it is possible to quantize the degree of distortion due to the process.

According to the aspect of (6), since the speech recognition process is performed with a component, which has a small degree of distortion, relatively emphasized, it is possible to further enhance the speech recognition rate.

DETAILED DESCRIPTION OF THE INVENTION

First Embodiment

Hereinafter, a first embodiment of the invention will be described with reference to the accompanying drawings.

Figure 1:
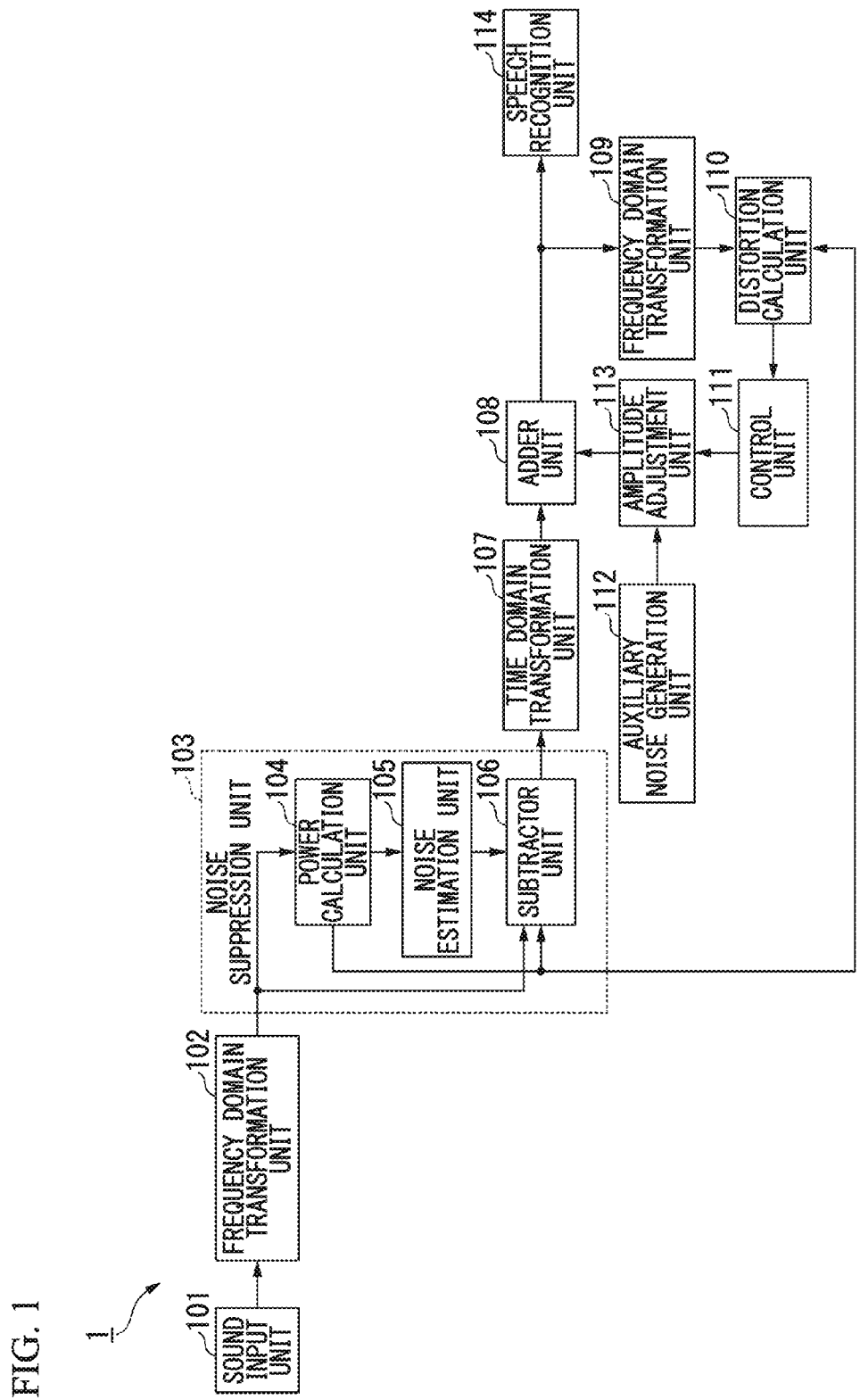
FIG. 1 is a schematic block diagram illustrating a configuration of a sound processing device according to a first embodiment of the invention.

FIG. 1 is a schematic block diagram illustrating a configuration of a sound processing device 1 according to the first embodiment of the invention.

The sound processing device 1 includes a sound input unit 101, a frequency domain transformation unit 102, a noise suppression unit 103, a time domain transformation unit 107, an adder unit (auxiliary noise addition unit) 108, a frequency domain transformation unit 109, a distortion calculation unit 110, a control unit 111, an auxiliary noise generation unit 112, an amplitude adjustment unit 113, and a speech recognition unit 114.

In the sound processing device 1, the noise suppression unit 103 suppresses a noise component included in an input sound signal and the auxiliary noise addition unit (adder unit) 108 adds auxiliary noise to the sound signal whose noise component has been suppressed by the noise suppression unit 103 to generate an auxiliary noise-added signal. In the sound processing device 1, the distortion calculation unit 110 calculates a degree of distortion of the generated auxiliary noise-added signal and the control unit 111 controls an addition amount by which the auxiliary noise is added by the auxiliary noise addition unit based on the calculated degree of distortion. Then, in the sound processing device 1, the speech recognition unit 114 performs a speech recognition process on the generated auxiliary noise-added signal.

The sound input unit 101 generates a sound signal y(t) which is an electrical signal based on an arriving sound wave and outputs the generated sound signal y(t) to the frequency domain transformation unit 102. Here, t represents time. The sound input unit 101 is, for example, a microphone that records a sound signal of an audible band (20 Hz to 20 kHz).

The frequency domain transformation unit 102 transforms the sound signal y(t), which is input from the sound input unit 101 and expressed in the time domain, to a complex input spectrum Y(k, l) expressed in the frequency domain. Here, k represents an index indicating a frequency and l represents an index indicating a frame. Here, the frequency domain transformation unit 102 performs a discrete Fourier transform (DFT) on the sound signal y(t), for example, for each frame l. The frequency domain transformation unit 102 may multiply the sound signal y(t) by a window function (for example, Hamming window) and may transform the sound signal multiplied by the window function to the complex input spectrum Y(k, l) expressed in the frequency domain.

The frequency domain transformation unit 102 outputs the transformed complex input spectrum Y(k, l) to the noise suppression unit 103.

The noise suppression unit 103 estimates a noise component of the complex input spectrum Y(k, l) input from the frequency domain transformation unit 102 and calculates a spectrum (complex noise-removed spectrum) of the sound signal whose estimated noise component has been suppressed. The noise suppression unit 103 includes a power calculation unit 104, a noise estimation unit 105, and a subtractor unit 106.

The power calculation unit 104 calculates a power spectrum $|Y(k, l)|^2$ based on the complex input spectrum $Y(k, l)$ input from the frequency domain transformation unit 102. In the following description, the power spectrum may be simply referred to as a power. Here, |CN| represents the absolute value of a complex number CN. The power calculation unit 104 outputs the calculated power spectrum $|Y(k, l)|^2$ to the noise estimation unit 105, the subtractor unit 106, and the distortion calculation unit 110.

The noise estimation unit 105 calculates a power spectrum $\lambda(k, l)$ of the noise component included in the power spectrum $|Y(k, l)|^2$ input from the power calculation unit 104. In the following description, the noise power spectrum $\lambda(k, l)$ may be simply referred to as a noise power $\lambda(k, l)$.

Here, the noise estimation unit 105 calculates the noise power $\lambda(k, l)$, for example, using a histogram-based recursive level estimation (HRLE) method. In the HRLE method, a histogram (frequency distribution) of the power spectrum $|Y(k, l)|^2$ in a logarithmic domain is calculated and the noise power $\lambda(k, l)$ is calculated based on the cumulative distribution thereof and a predetermined cumulative frequency Lx (for example, 0.3). The cumulative frequency Lx is a parameter for determining the noise power of background noise included in a recorded sound signal, that is, a control parameter for controlling a suppression amount of the noise component which is suppressed by the subtractor unit 106. The larger the cumulative frequency Lx becomes, the larger the suppression amount becomes. The smaller the cumulative frequency Lx becomes, the smaller the suppression amount becomes. When the cumulative frequency Lx is 0, the suppression amount is also 0. The process flow of calculating the noise power $\lambda(k, l)$ using the HRLE method will be described later.

In this embodiment, the noise estimation unit 105 may calculate the noise power $\lambda(k, l)$ using another method of estimating a noise component, such as a minima-controlled recursive average (MCRA) method, instead of the HRLE method. When the MCRA method is used, a control parameter for controlling the suppression amount of noise introduced in the MCRA method is used instead of the cumulative frequency Lx. For example, such a control parameter is a set of a mixing ratio $\alpha_d$ of the estimated stationary noise and a coefficient r used to estimate a stationary noise.

The noise estimation unit 105 outputs the calculated noise power $\lambda(k, l)$ to the subtractor unit 106.

The subtractor unit 106 calculates a complex noise-removed spectrum X'(k, l) by subtracting the noise power $\lambda(k, l)$ from the power spectrum $|Y(k, l)|^2$ input from the power calculation unit 104.

Here, the subtractor unit 106 calculates a gain $G_{SS}(k, l)$, for example, using Expression (1), based on the power spectrum $|Y(k, l)|^2$ input from the power calculation unit 104 and the noise power $\lambda(k, l)$ input from the noise estimation unit 105.

$$G_{SS}(k,l) = \max[\sqrt{\{|(k,l)|^2 - \lambda(k,l)\}/|Y(k,l)|^2}, \beta] \quad (1)$$

In Expression (1), $\max(\alpha, \beta)$ represents a function of providing the larger number of real numbers $\alpha$ and $\beta$. Here, $\beta$ is a minimum value of a predetermined gain $G_{SS}(k, l)$. Here, the left side (the real number $\alpha$ side) of the function max represents the square root of a ratio of the power spectrum $|Y(k, l)|^2 - \lambda(k, l)$ in which the noise component associated with a frequency k in a frame l is removed with respect to the power spectrum $|Y(k, l)|^2$ in which the noise is not removed.

The subtractor unit 106 calculates the complex noise-removed spectrum X'(k, l) by multiplying the complex input spectrum Y(k, l) input from the frequency domain transformation unit 102 by the calculated gain $G_{SS}(k, l)$. That is, the complex noise-removed spectrum X'(k, l) is a complex spectrum in which the noise power representing the noise component is subtracted (suppressed) from the complex input spectrum Y(k, l). The subtractor unit 106 outputs the calculated complex noise-removed spectrum X'(k, l) to the time domain transformation unit 107.

The time domain transformation unit 107 transforms the complex noise-removed spectrum x'(k, l) input from the subtractor unit 106 into a noise-removed signal X'(t) in the time domain. Here, the time domain transformation unit 107 performs, for example, an inverse discrete Fourier transform (IDFT) on the complex noise-removed spectrum X'(k, l) for each frame l and calculates the noise-removed signal x'(t). The time domain transformation unit 107 outputs the transformed noise-removed signal x'(t) to the adder unit 108. That is, the noise-removed signal x'(t) is a sound signal which is obtained by suppressing the estimated noise component from the sound signal y(t) by the use of the noise suppression unit 103.

The adder unit 108 adds (sums) the noise-removed signal x'(t) input from the time domain transformation unit 107 and the auxiliary noise signal w'(t) whose amplitude has been adjusted by the amplitude adjustment unit 113 to generate an auxiliary noise-added signal x(t). The adder unit 108 outputs the generated auxiliary noise-added signal x(t) to the frequency domain transformation unit 109 and the speech recognition unit 114.

The frequency domain transformation unit 109 transforms the auxiliary noise-added signal x(t) input from the adder unit 108 to a complex auxiliary noise-added spectrum X(k, l) expressed in the frequency domain. The process performed on the auxiliary noise-added signal x(t) by the frequency domain transformation unit 109 may be the same as the process performed on the sound signal y(t) by the frequency domain transformation unit 102. The frequency domain transformation unit 109 outputs the transformed complex auxiliary noise-added spectrum X(k, l) to the distortion calculation unit 110.

The distortion calculation unit 110 performs the above-mentioned process based on the complex auxiliary noise-added spectrum X(k, l), that is, mainly calculates an index value indicating the degree of distortion generated by the noise suppression unit 103.

When the noise suppression unit 103 performs the process of suppressing the spectrum of the estimated noise component, a distortion component having one or more components having large power in a specific narrow frequency band may remain in the complex noise-removed spectrum X'(k, l) or the complex auxiliary noise-added spectrum X(k, l). Such a distortion component is called musical noise and serves as a factor for lowering the speech recognition rate.

The distortion calculation unit 110 mainly calculates a statistic based on a third or higher moment in a frequency distribution (histogram) P(x) of power x of the complex auxiliary noise-added spectrum X(k, l) as an index value indicating characteristics of musical noise. In the following description, the frequency distribution P(x) may be simply referred to as frequency P(x). The distortion calculation unit 110 calculates, for example, a kurtosis K as such an index value. The kurtosis K is a statistic indicating the kurtosis of the frequency distribution. A larger kurtosis K represents a distribution having a sharper peak and a longer foot, and a smaller kurtosis K represents a distribution having a duller peak and a shorter foot. Specifically, the kurtosis K is $\mu_4/\mu_2^2$. Here, $\mu_4$ represents a fourth moment $\mu_4$ of the frequency distribution P(x). $\mu_2^2$ represents a square, that is, a variance of a second moment $\mu_2$. The degree of distortion can be quantitatively by the kurtosis K.

An n-th (where n is an integer greater than 1) moment $\mu_n$ is expressed by Expression (2).

$$\mu_n \int_0^\infty (x-\mu)^n P(x) dx \quad (2)$$

In Expression (2), $\mu$ represents an expected value of the power x when the frequency distribution P(x) is given.

The distortion calculation unit 110 may calculate a skewness S as the index value. The skewness S is a statistic representing a bias of a frequency distribution. The larger skewness S represents that the frequency distribution P(x) is biased in a direction in which the power x increases, and the smaller skewness S represents that the frequency distribution P(x) is biased in a direction in which the power x decreases. When the frequency distribution P(x) is a normal distribution, the skewness is 0. The skewness S is a third moment $\mu_3$ of the frequency distribution P(x).

The distortion calculation unit 110 may calculate a kurtosis ratio $K_R$ as the index value. The kurtosis ratio $K_R$ is equal to $K_{proc}/K_{orig}$. Here, $K_{proc}$ represents the kurtosis of the complex auxiliary noise-added spectrum X(k, 1), and $K_{orig}$ represents the kurtosis of the complex input spectrum Y(k, 1) input from the frequency domain transformation unit 102. That is, the kurtosis ratio $K_R$ is an index value obtained by quantizing the distortion generated by the process of suppressing the noise component and the process of adding the auxiliary noise signal.

The distortion calculation unit 110 may calculate a skewness difference $S_D$ as the index value. The skewness difference $S_D$ is a difference between the skewness $S_{proc}$ of the complex auxiliary noise-added spectrum X(k, 1) and the skewness $S_{orig}$ of the complex input spectrum Y(k, 1).

The distortion calculation unit 110 outputs the calculated index of the degree of distortion to the control unit 111.

In the following description, an example where the kurtosis ratio $K_R$ is mainly used as the index value of the degree of distortion will be described, but in this embodiment and an embodiment to be described later, the kurtosis K, the skewness S, and the skewness difference $S_D$ may be used instead of the kurtosis ratio $K_R$.

The control unit 111 controls the addition amount of the auxiliary noise signal based on the index value input from the distortion calculation unit 110. The addition amount of the auxiliary noise signal is expressed, for example, by a ratio of the average power of the auxiliary noise signal w'(t) whose amplitude has been adjusted to the average power of the noise-removed signal x'(t). This ratio is a dimensionless quantity.

The control unit 111 stores in advance, for example, speech recognition rate correlation information in which the index value indicating the degree of distortion is correlated with the speech recognition rate and addition amount correlation information in which the index value is correlated with the addition amount of the auxiliary noise signal in a storage unit thereof. The speech recognition rate correlation information may be a table indicating the relationship between the index value and the speech recognition rate or may be a mathematical expression (function) for calculating the speech recognition rate based on the index value or coefficients thereof. The addition amount correlation information may be a table indicating the relationship between the index value and the addition amount or may be a mathematical expression (function) for calculating the addition amount based on the index value. Examples of the speech recognition rate correlation information and the addition amount correlation information will be described later. As will be described later, there is an index value in which the corresponding speech recognition rate is the highest in the speech recognition rate correlation information. The addition amount corresponding to the index value in which the speech recognition rate is the highest is an ideal addition amount in which the speech recognition rate is the highest.

The control unit 111 estimates the speech recognition rate corresponding to the input index value based on the speech recognition rate correlation information. The control unit 111 determines the addition amount corresponding to the input index value based on the addition amount correlation information. The control unit 111 calculates a differential addition amount which is a difference between the determined addition amount and the ideal addition amount and outputs the calculated differential addition amount to the amplitude adjustment unit 113. By using the differential addition amount to control the addition amount, the relationship between the index value associated with a predetermined sound source and the speech recognition rate can be used even when the index value or the speech recognition rate varies depending on the sound sources. Accordingly, the addition amount is controlled so as to maximize the speech recognition rate.

The auxiliary noise generation unit 112 generates an auxiliary noise signal w indicating auxiliary noise. The auxiliary noise generation unit 112 generates a signal indicating, for example, white noise in which the power is constant in each frequency band. For example, a pseudorandom number sequence such as an M sequence can be used as such a signal. Otherwise, the auxiliary noise generation unit 112 may generate pink noise in which the power is substantially constant in octave bands. The auxiliary noise generated by the auxiliary noise generation unit 112 is not limited to broadband noise such as white noise or pink noise and, for example, band noise whose frequency band is limited may be used as long as it can be added to the noise-removed signal x'(t) to enhance the speech recognition rate. The auxiliary noise generation unit 112 outputs the generated auxiliary noise signal w to the amplitude adjustment unit 113.

The amplitude adjustment unit 113 adds the differential addition amount input from the control unit 111 to the current addition amount to update the addition amount. The amplitude adjustment unit 113 adjusts the amplitude of the auxiliary noise signal w(t) input from the auxiliary noise generation unit 112 based on the updated addition amount and outputs the auxiliary noise signal w'(t) whose amplitude has been adjusted to the adder unit 108. The amplitude adjustment unit 113 is, for example, an amplifier that increases or decreases the amplitude of an input sound signal.

The speech recognition unit 114 performs a speech recognition process on the auxiliary noise-added signal x(t) input from the adder unit 108 and recognizes speech details such as phoneme sequences or words. For example, the speech recognition unit 114 includes a hidden Markov model (HMM) which is an acoustic model and a word dictionary. The speech recognition unit 114 calculates a sound feature amount of the auxiliary noise-added signal x(t), for example, 13 static mel-scale log spectrums (MSLS), 13 delta MSLS, and one delta power, for every predetermined time. The speech recognition unit 114 determines phonemes from the calculated sound feature amount using the acoustic model and recognizes words from the phoneme sequence including the determined phonemes using the word dictionary.

A noise estimation process of causing the noise estimation unit 105 to calculate a noise power $\lambda(k, l)$ using the HRLE method will be described below.

Figure 2:
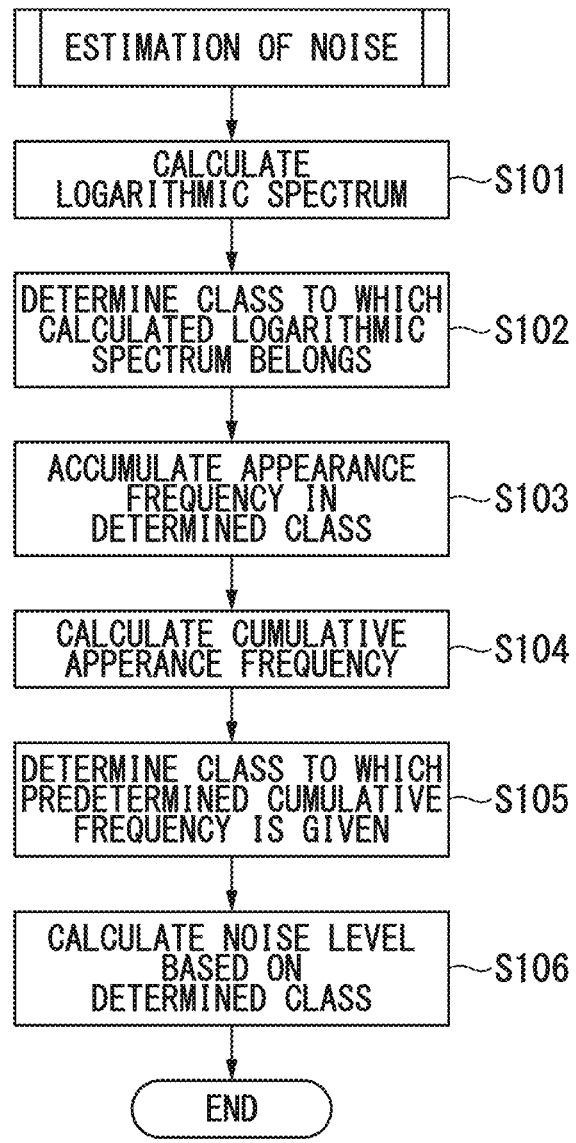
FIG. 2 is a flowchart illustrating an example of a noise estimation process flow according to the first embodiment.

FIG. 2 is a flowchart illustrating an example of a noise estimation process flow according to this embodiment.

(Step S101) The noise estimation unit 105 calculates a logarithmic spectrum $Y_L(k, l)$ based on the power spectrum $|Y(k, l)|^2$. Here, $Y_L(k, l)=20 \log_{10}|Y(k, l)|$ is established. Thereafter, the process proceeds to step S102.

(Step S102) The noise estimation unit 105 determines a class $I_y(k, l)$ to which the calculated logarithmic spectrum $Y_L(k, l)$ belongs. Here, $I_y(k, l)=\text{floor}(Y_L(k, l)-L_{min})/L_{step}$ is established. Here, floor(A) is a floor function that provides a real number A or a maximum integer smaller than A. $L_{min}$ and $L_{step}$ represent a predetermined minimum level and a level width of each class, respectively. Thereafter, the process proceeds to step S103.

(Step S103) The noise estimation unit 105 accumulates the appearance frequency N(k, l) in the class $I_y(k, l)$ of the current frame l. Here, $N(k, l, i)=\alpha N(k, l-1, i)+(1-\alpha)\delta(i-I_y(k, l))$ is established. Here, $\alpha$ represents a time decay parameter. $\alpha=1-1/(T_r \cdot F_s)$ is established. $T_r$ represents a predetermined time constant. $F_s$ represents a sampling frequency. $\delta(X)$ represents a Dirac's delta function. Here, i is an index indicating an arbitrary class, that is, a section of the logarithmic spectrum $Y_L(k, l)$. That is, the appearance frequency $N(k, l, I_y(k, l))$ is obtained by adding $(1-\alpha)$ to a value damped by multiplying the appearance frequency $N(k, l-1, I_y(k, l))$ in the previous frame l-1 by $\alpha$. Thereafter, the process proceeds to step S104.

(Step S104) The noise estimation unit 105 calculates a cumulative appearance frequency S(k, l, i) by adding the appearance frequencies N(k, l, i') from the lowest class 0 to the class i. Thereafter, the process proceeds to step S105.

(Step S105) The noise estimation unit 105 determines as an estimation coefficient $I_x(k, l)$ a coefficient i for giving a cumulative appearance frequency S(k, l, i) most approximate to the cumulative appearance frequency $S(k, l, I_{max}) \cdot Lx/100$ corresponding to a predetermined cumulative frequency Lx. That is, the estimation coefficient $I_x(k, l)$ has the following relationship with the cumulative appearance frequency S(k, l, i): $I_x(k, l)=\arg_i \min[S(k, l, I_{max}) \cdot Lx/100-S(k, l, i)]$. Here, $\arg_i(C)$ represents a value of i satisfying the condition C. Thereafter, the process proceeds to step S106.

(Step S106) The noise estimation unit 105 converts the determined estimation coefficient $I_x(k, l)$ into a logarithmic level $\lambda_{HRLE}(k, l)$. Here, $\lambda_{HRLE}(k, l)=L_{min}+L_{step} \cdot I_x(k, l)$ is established. The logarithmic level $\lambda_{HRLE}(k, l)$ is converted into a linear domain and the noise power $\lambda(k, l)$ is calculated. That is, $\lambda(k, l)=10^{(\lambda_{HREL}(k, l)/20)}$ is established. Thereafter, the process flow ends.

An example of the power spectrum $|Y(k, l)|^2$ calculated by the power calculation unit 104 will be described below.

Figure 3:
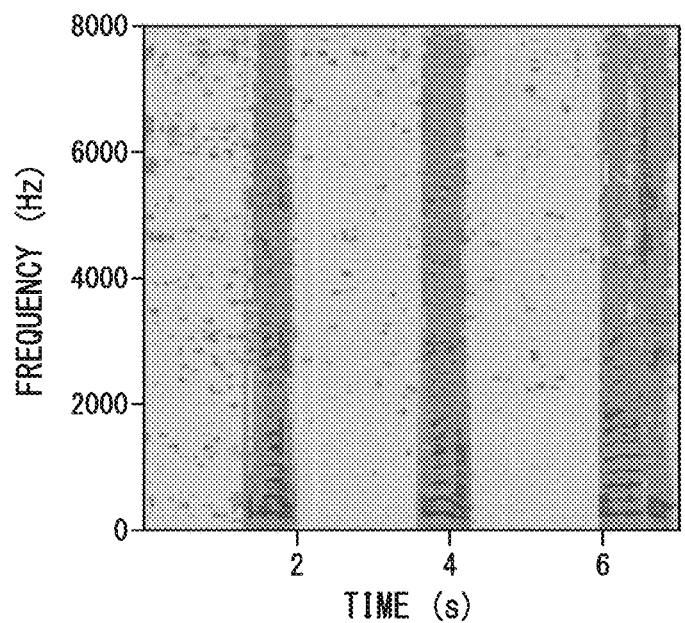
FIG. 3 is a spectrogram illustrating an example of a temporal variation of a power spectrum.

FIG. 3 is a spectrogram illustrating an example of a temporal variation of the power spectrum $|Y(k, l)|^2$.

In FIG. 3, the horizontal axis represents time and the vertical axis represents frequency. In FIG. 3, the magnitude of power is expressed by shading. As illustrated in the right side of FIG. 3, an area having a larger power is darker and an area having a smaller power is lighter.

In FIG. 3, three sections of times of 1.3 s to 2.0 s, 3.3 s to 4.2 s, and 5.9 s to 6.7 s are illustrated to be darker than the other sections. These three sections are speech sections in which an uttered speech is included in a recorded signal.

Figure 4:
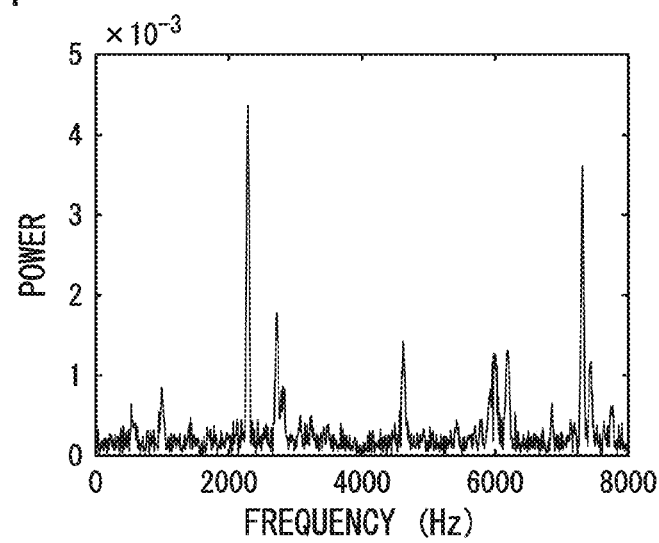
FIG. 4 is a diagram illustrating an example of power based on a complex auxiliary noise-added spectrum.

FIG. 4 is a diagram illustrating an example of power based on the complex auxiliary noise-added spectrum $\lambda(k, l)$.

In FIG. 4, the horizontal axis represents frequency and the vertical axis represents power. Here, the numerical value of the vertical axis is a dimensionless value which is normalized with a set value unique to the device.

FIG. 4 illustrates power based on the complex auxiliary noise-added spectrum X(k, l) at a certain time (for example, 4.0 s) in the speech sections. For example, the curve indicating the power has a sharp peak in the vicinity of 2200 Hz or 7200 Hz. These peaks represent musical noise, that is, distortion generated by the process of causing the noise suppression unit 103 to suppress a noise component.

Figure 5:
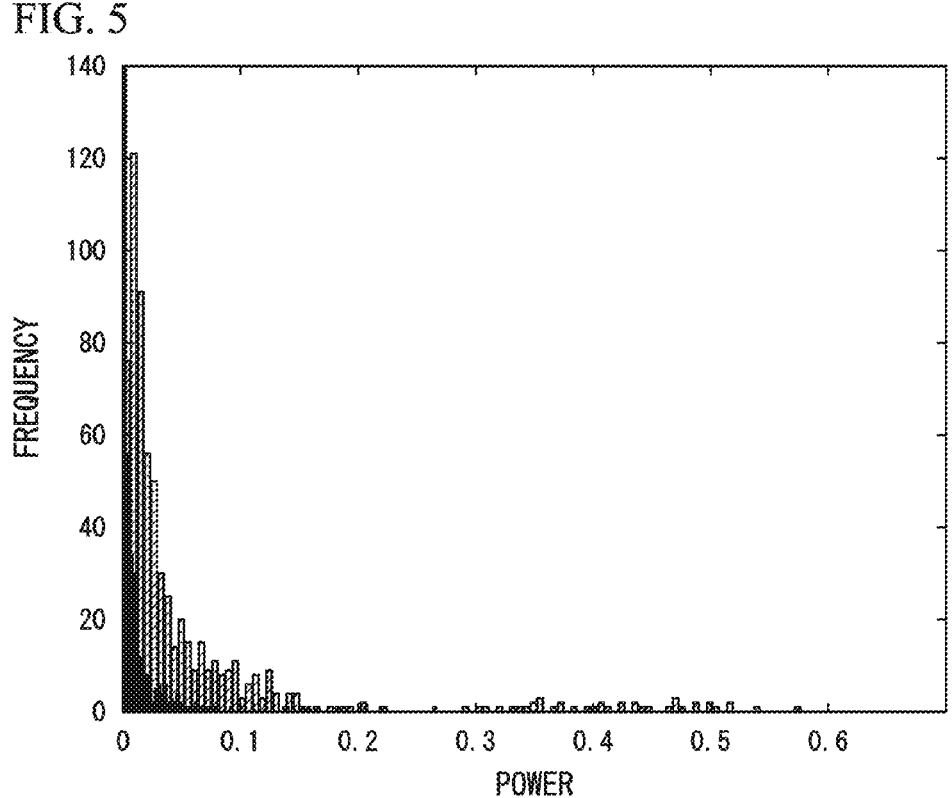
FIG. 5 is a diagram illustrating an example of a frequency distribution of power.

FIG. 5 illustrates an example of the frequency distribution P(x) of the power x.

In FIG. 5, the horizontal axis represents power and the vertical axis represents frequency. Here, the frequency means a frequency by which quantized power quantized with a predetermined power quantization width (0.01 in the example illustrated in FIG. 5) appears within a predetermined time. The frequency distribution blacked out in FIG. 5 represents a frequency distribution of the complex input spectrum Y(k, l) in which the noise component is not suppressed. The frequency distribution hatched in FIG. 5 represents a frequency distribution of power based on the complex auxiliary noise-added spectrum X(k, l) calculated from the complex input spectrum Y(k, l) at the same time. As illustrated in FIG. 5, the frequency distribution of the power based on the complex auxiliary noise-added spectrum X(k, l) is distributed in an area in which the value of power is larger. This means that distortion is applied to the complex auxiliary noise-added spectrum X(k, l) by the processes as illustrated in FIG. 4.

A process flow of causing the distortion calculation unit 110 to calculate a statistic based on a third or higher moment as an index value based on the complex auxiliary noise-added spectrum X(k, l) will be described below.

Figure 6:
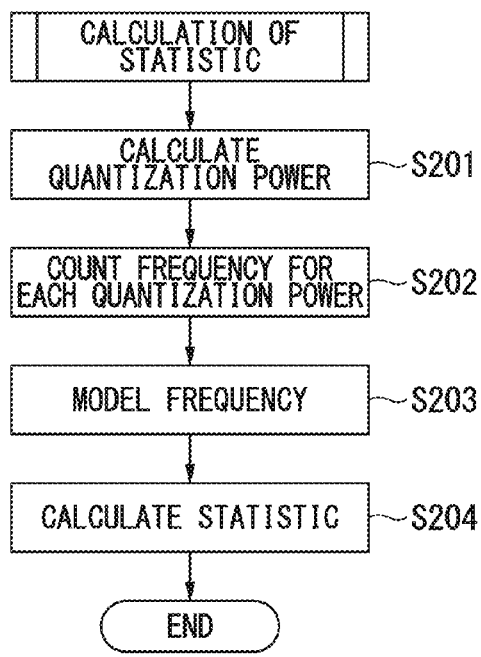
FIG. 6 is a flowchart illustrating a process flow of causing a distortion calculation unit to calculate a statistic according to the first embodiment.

FIG. 6 is a flowchart illustrating the process flow of causing the distortion calculation unit 110 to calculate a statistic according to this embodiment.

(Step S201) The distortion calculation unit 110 calculates power of the complex auxiliary noise-added spectrum X(k, l). The distortion calculation unit 110 calculates quantized power x obtained by quantizing the calculated power with a predetermined quantization width. Thereafter, the process proceeds to step S202.

(Step S202) The distortion calculation unit 110 counts the frequency P(x) of each quantized power x by accumulating the number of times in which the quantized power x appears from a time point prior to the current frame l by a predetermined cumulative time (for example, 20 seconds) to the current frame l. The distortion calculation unit 110 may calculate $\alpha'P'(x)+(1-\alpha')$ as the current frequency P(x) instead of directly counting the frequency and may determine the calculated value as the frequency P(x). $\alpha'$ is a time decay parameter greater than 0 and smaller than 1 and is a value corresponding to the cumulative time. P'(x) is a frequency P(x) in the previous frame l-1. Thereafter, the process proceeds to step S203.

(Step S203) The distortion calculation unit 110 models (applies) the frequency P(x) with (to) a probability density function of a gamma distribution expressed by Expression (3).

$$P(x) = \frac{1}{\Gamma(a)\theta^a} x^{a-1} \exp\left(-\frac{x}{\theta}\right) \quad (3)$$

In Expression (3), Γ(A) represents a gamma function of a real number A. In addition, a represents a shape parameter and θ represents a scale parameter. Here, the distortion calculation unit 110 calculates the shape parameter a and the scale parameter θ, for example, using Expression (4) and Expression (5), respectively.

$$a = \frac{3 - \gamma + \sqrt{(\gamma - 3)^3 + 24\gamma}}{12\gamma} \quad (4)$$

$$\theta = E[x]/a \quad (5)$$

In Expression (4), γ=log(E[x])−E[log(x)] is established. E[A] represents an expected value. Thereafter, the process proceeds to step S204.

(Step S204) The distortion calculation unit 110 calculates a statistic based on the shape parameter a and the scale parameter θ. For example, the distortion calculation unit 110 calculates the skewness $S_{proc}$ by 2/√a. The distortion calculation unit 110 calculates the kurtosis $K_{proc}$ by 6/a. Thereafter, the process flow illustrated in FIG. 6 ends.

Accordingly, the distortion calculation unit 110 can calculate the statistics such as the skewness $S_{proc}$ and the kurtosis $K_{proc}$ of the complex auxiliary noise-added spectrum X(k, l) with a relatively low calculation load. The distortion calculation unit 110 can calculate the statistics such as the skewness $S_{proc}$ and the kurtosis $K_{proc}$ of the complex input spectrum Y(k, l) in the same way. Then, the distortion calculation unit 110 may calculate the kurtosis ratio $K_R$ based on the kurtosis $K_{proc}$ and the kurtosis $K_{orig}$ and may calculate the skewness difference $S_D$ based on the skewness $S_{proc}$ and the skewness $S_{orig}$.

An example of the kurtosis ratio $K_R$ which is a kind of index value indicating a degree of distortion will be described below.

Figure 7:
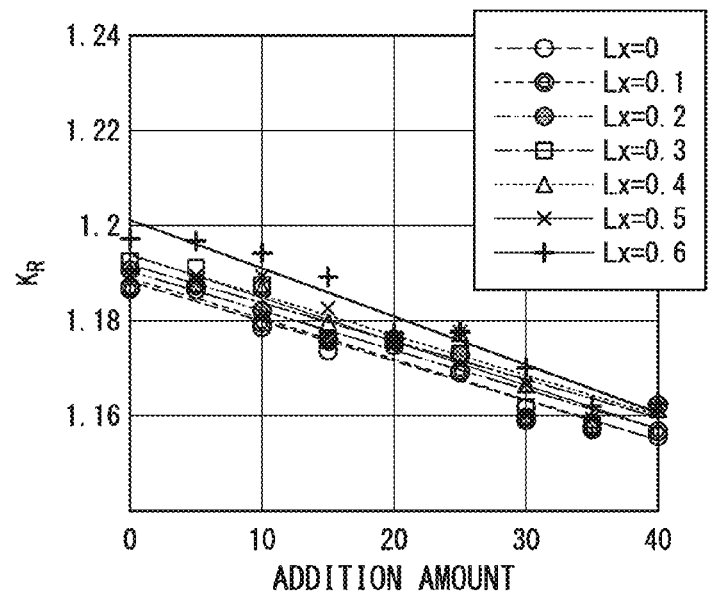
FIG. 7 is a diagram illustrating an example of a kurtosis ratio.

FIG. 7 is a diagram illustrating an example of the kurtosis ratio $K_R$.

In FIG. 7, the horizontal axis represents the addition amount of the auxiliary noise signal and the vertical axis represents the kurtosis ratio $K_R$. The addition amount illustrated in FIG. 7 is a value expressing a ratio of the average amplitude of the auxiliary noise signal w'(t) whose amplitude has been adjusted to the average amplitude of the noise-removed signal x'(t) by percentage. The minimum value of the addition amount is 0 and the maximum value thereof is 100. Here, the addition amount illustrated in FIG. 7 is limited to 0 to 40. In this example, a sound signal recorded when one person utters speech under an environment in which white noise is added as noise is used.

FIG. 7 illustrates the relationship between the addition amount and the kurtosis ratio $K_R$ for each of the cumulative frequencies Lx of 0, 0.1, 0.2, 0.3, 0.4, 0.5, and 0.6. Here, the larger the addition amount becomes, the less the kurtosis ratio $K_R$ becomes linearly. This relationship means that the distortion generated by removal of the noise component is alleviated by adding the auxiliary noise signal thereto. In the cumulative frequency Lx of 0 to 0.5, a significant difference is not observed in the relationship between the addition amount and the kurtosis ratio $K_R$ and it can be seen that the relationship has almost no dependency on the cumulative frequency Lx.

For example, the control unit 111 may store the addition amount correlation information indicating the relationship between the kurtosis ratio $K_R$ and the addition amount illustrated in FIG. 7. The addition amount correlation information may be information indicating a linear function of the kurtosis ratio $K_R$ and the addition amount. Accordingly, the relationship between the kurtosis ratio $K_R$ and the addition amount for a predetermined sound source is given as a target value of the kurtosis ratio $K_R$ corresponding to the addition amount.

Dependency of the kurtosis ratio $K_R$ on the speech recognition rate will be described below.

Figure 8:
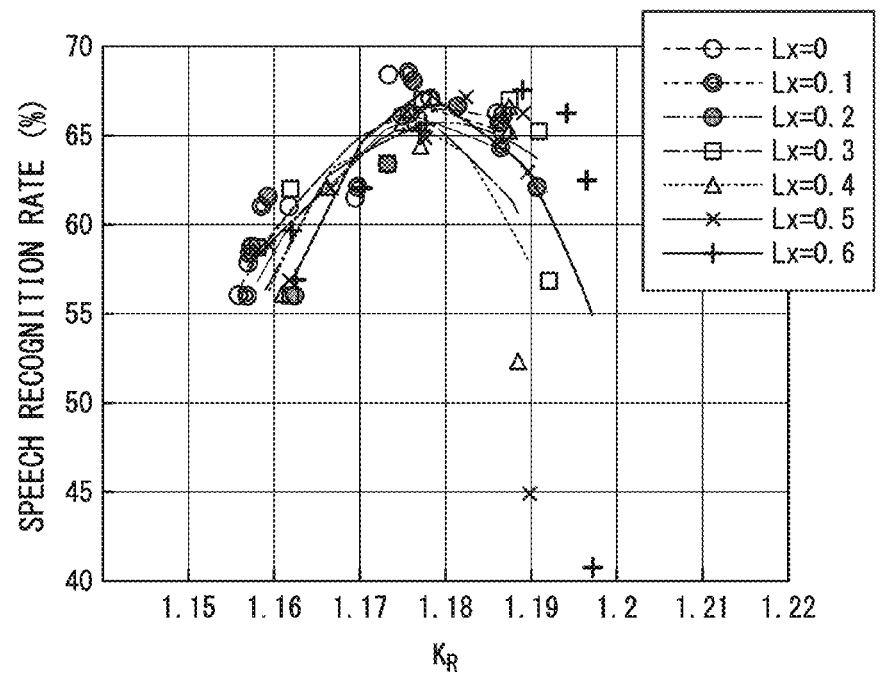
FIG. 8 is a diagram illustrating an example of a speech recognition rate.

FIG. 8 is a diagram illustrating an example of the speech recognition rate.

In FIG. 8, the horizontal axis represents the kurtosis ratio $K_R$ and the vertical axis represents the speech recognition rate. The speech recognition rate illustrated in FIG. 8 is a word recognition rate (WCR) when one female utters speech with white noise added as the recorded noise. In this example, the word recognition rate is a value obtained by dividing the number of times (the number of correct answers) in which the uttered words are correctly recognized by the total number of pieces of speech (216 in total). Here, the kurtosis ratio $K_R$ is calculated in a speech section.

FIG. 8 illustrates the relationship between the kurtosis ratio $K_R$ and the speech recognition rate for each of the cumulative frequencies Lx of 0, 0.1, 0.2, 0.3, 0.4, 0.5, and 0.6. A significant difference is not observed in the relationship between the kurtosis ratio $K_R$ and the speech recognition rate, the recognition rate is 66% which is the highest when the kurtosis ratio $K_R$ is about 1.18, and a significant difference due to the cumulative frequency Lx is not observed. As the addition amount increases, the kurtosis ratio $K_R$ decreases and the speech recognition rate increases, but the recognition rate at which the influence of auxiliary noise to be added appears decreases after the speech recognition rate is the highest.

For example, speech recognition rate correlation information indicating the correlation between the kurtosis ratio $K_R$ and the speech recognition rate illustrated in FIG. 8 may be stored in the control unit 111. The speech recognition rate correlation information may be information indicating a function (for example, quadratic function) in which the speech recognition rate has a maximum value with respect to the kurtosis ratio $K_R$.

Accordingly, the addition amount corresponding to the kurtosis ratio which maximizes the speech recognition rate of a predetermined sound source is given as a target value of the addition amount.

A sound processing flow according to this embodiment will be described below.

Figure 9:
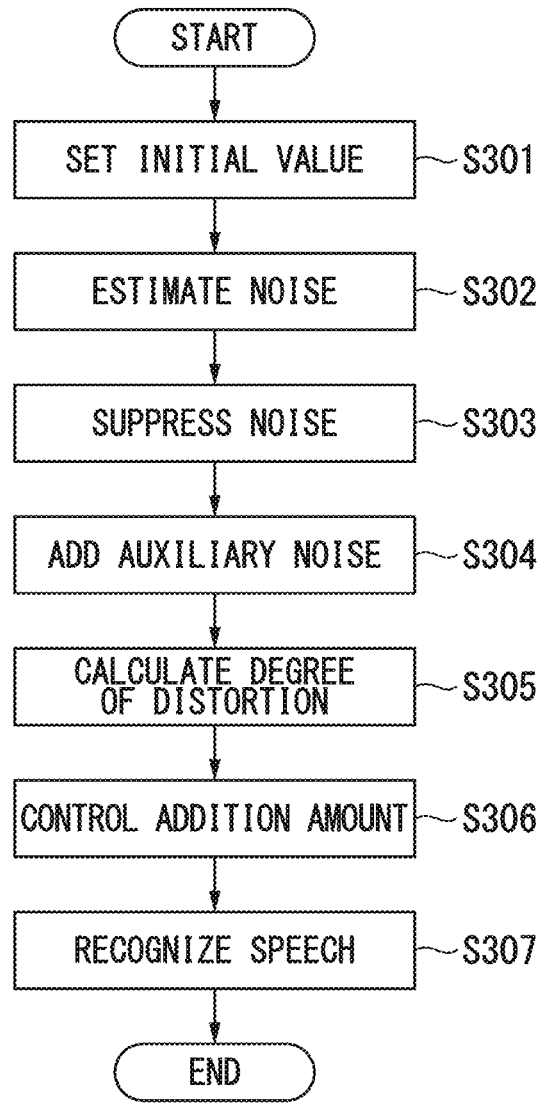
FIG. 9 is a flowchart illustrating a sound processing flow according to the first embodiment.

FIG. 9 is a flowchart illustrating a sound processing flow according to this embodiment.

(Step S301) The sound processing device 1 sets parameters used for the processing to predetermined initial values (initialization). Examples of such parameters include the cumulative frequency Lx when the noise estimation unit 105 uses the HRLE method and the addition amount in the amplitude adjustment unit 113. Thereafter, the process proceeds to step S302.

(Step S302) The power calculation unit 104 calculates a power spectrum $|Y(k, l)|^2$ based on a complex input spectrum $Y(k, l)$ which expresses a sound signal $y(t)$ in the frequency domain. The noise estimation unit 105 estimates a noise component by calculating a noise power $\lambda(k, l)$ included in the power spectrum $|Y(k, l)|^2$, for example, using the HRLE method. Thereafter, the process proceeds to step S303.

(Step S303) The subtractor unit 106 calculates a complex noise-removed spectrum $X'(k, l)$ from which the noise component is removed by subtracting the noise power $\lambda(k, l)$ from the power spectrum $|Y(k, l)|^2$. Accordingly, the noise component is suppressed. Thereafter, the process proceeds to step S304.

(Step S304) The adder unit 108 generates an auxiliary noise-added signal $x(t)$ by adding the auxiliary noise signal $w'(t)$ whose amplitude has been adjusted to a noise-removed signal $x'(t)$ which is obtained by transforming the complex noise-removed spectrum $X'(k, l)$ to the time domain. Thereafter, the process proceeds to step S305.

(Step S305) The distortion calculation unit 110 calculates, for example, the kurtosis ratio $K_R$ as the index value indicating the degree of distortion of the complex auxiliary noise-added spectrum $X(k, l)$ which is obtained by transforming the auxiliary noise-added signal $x(t)$ to the time domain. Thereafter, the process proceeds to step S306.

(Step S306) The control unit 111 controls the addition amount by which the auxiliary noise signal $w(t)$ is added to the noise-removed signal $x'(t)$ so as to maximize the speech recognition rate based on the kurtosis ratio $K_R$ as the index value indicating the degree of distortion. Here, the control unit 111 determines, for example, the addition amount corresponding to the kurtosis ratio $K_R$ based on the stored addition amount correlation information and calculates a differential addition amount which is a difference between the determined addition amount and the ideal addition amount in which the speech recognition rate is maximized. Thereafter, the process proceeds to step S307.

(Step S307) The speech recognition unit 114 performs a speech recognition process on the auxiliary noise-added signal $x(t)$, which is obtained by adding the auxiliary noise signal $w'(t)$ whose amplitude has been adjusted to the noise-removed signal $x'(t)$, and recognizes the speech details. Thereafter, the process flow ends.

As described above, in this embodiment, the noise component included in the input sound signal is suppressed, the auxiliary noise-added signal is generated by adding the auxiliary noise to the sound signal whose noise component has been suppressed, and the degree of distortion of the auxiliary noise-added signal is calculated. In this embodiment, the addition amount of the auxiliary noise is controlled based on the calculated degree of distortion. Accordingly, since the auxiliary noise is added by the addition amount corresponding to the degree of distortion of a sound to alleviate the distortion, it is possible to enhance the speech recognition rate.

In this embodiment, since the speech recognition rate is estimated based on the auxiliary noise-added signal and the addition amount of the auxiliary noise is controlled to maximize the estimated speech recognition rate, it is possible to further enhance the speech recognition rate.

Second Embodiment

Hereinafter, a second embodiment of the invention will be described with reference to the accompanying drawings. In the following description, the same elements as in the first embodiment will be referenced by the same reference signs.

Figure 10:
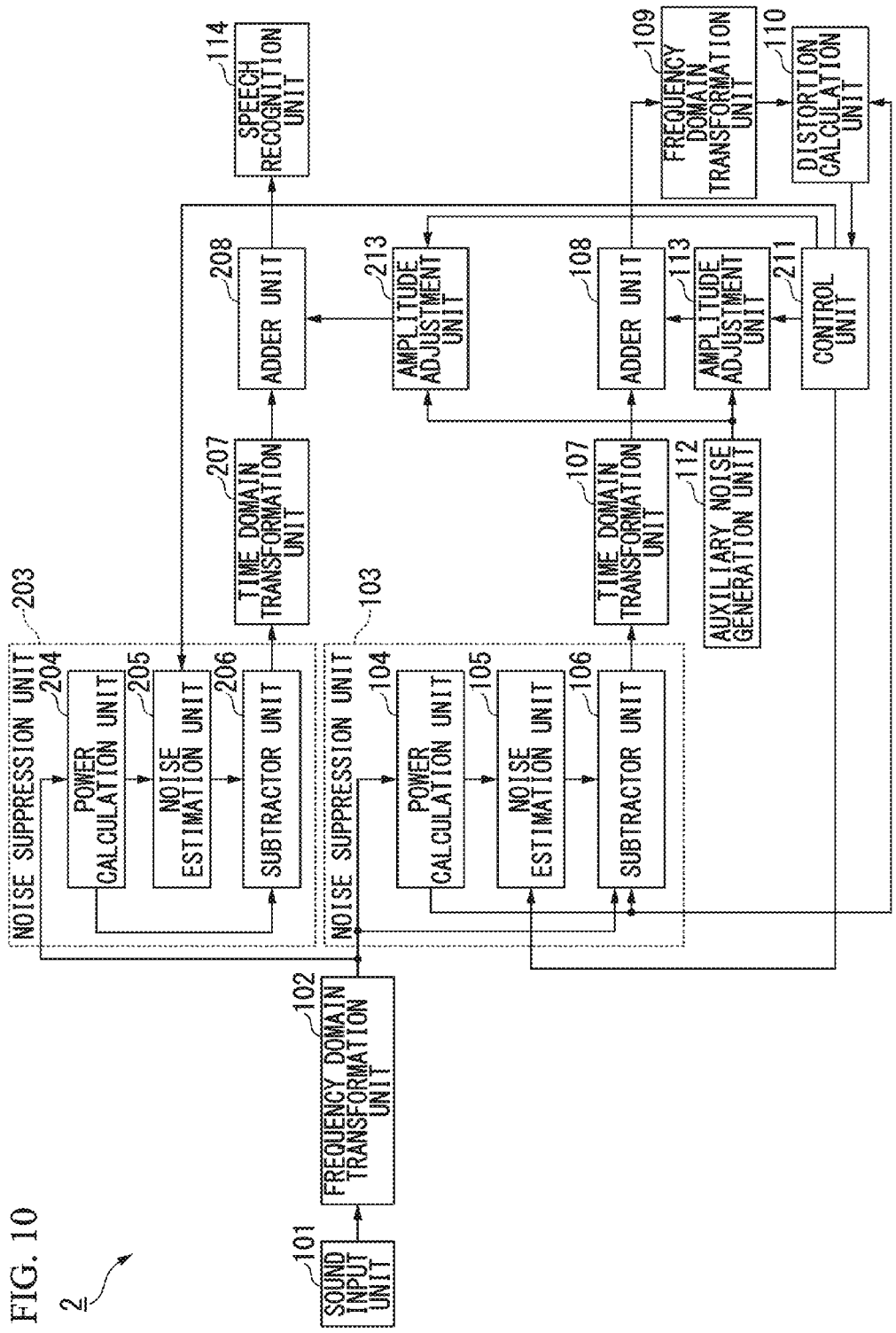
FIG. 10 is a schematic block diagram illustrating a configuration of a sound processing device according to a second embodiment of the invention.

FIG. 10 is a schematic block diagram illustrating a configuration of a sound processing device 2 according to the second embodiment of the invention.

The sound processing device 2 includes a control unit 211 instead of the control unit 111 of the sound processing device 1 (FIG. 1) and includes a noise suppression unit 203, a time domain transformation unit 207, an adder unit 208, and an amplitude adjustment unit 213.

In the sound processing device 2, the adder unit 108 does not output the generated auxiliary noise-added signal $x(t)$ to the speech recognition unit 114, and the auxiliary noise-added signal $x(t)$ is used for the control unit 211 to control the cumulative frequency Lx or the addition amount as will be described later. In the sound processing device 2, the noise suppression unit 203 suppresses a noise component based on the cumulative frequency Lx determined by the control unit 211. The auxiliary noise-added signal obtained by adding the auxiliary noise signal whose amplitude has been adjusted with the addition amount controlled by the control unit 211 is used for the speech recognition process in the speech recognition unit 114.

The control unit 211 controls the addition amount of the auxiliary noise signal based on the index value input from the distortion calculation unit 110 similarly to the control unit 111 (FIG. 1). Here, the control unit 211 determines the speech recognition rate with respect to one or more cumulative frequencies Lx other than the cumulative frequency Lx previously set in the noise estimation unit 105. In the following description, the cumulative frequency Lx other than the previously-set cumulative frequency Lx may be referred to as an additional cumulative frequency Lx.

Here, addition amount correlation information and speech recognition rate correlation information are stored in advance in a storage unit of the control unit 211. In the speech recognition rate correlation information, a speech recognition rate is correlated with a set of an index value indicating a degree of distortion and a cumulative frequency Lx (FIG. 8). In the addition amount correlation information, an addition amount is correlated with a set of a cumulative frequency Lx and an index value indicating a degree of distortion (FIG. 7).

The control unit 211 outputs one or more additional cumulative frequencies Lx to the noise estimation unit 105 and the noise estimation unit 105 calculates a noise power $\lambda(k, l)$ for each additional cumulative frequency Lx. The subtractor unit 106 calculates complex noise-removed spectrums $X'(k, l)$ based on the calculated noise powers $\lambda(k, l)$. The adder unit 108 generates auxiliary noise-added signals $x(t)$ by adding an auxiliary noise signal $w'(t)$, whose amplitude has been adjusted with a predetermined addition amount by the amplitude adjustment unit 113, to the noise-removed signals $x'(t)$ calculated by the time domain transformation unit 107. The distortion calculation unit 110 calculates index values indicating the degrees of distortion of the calculated complex auxiliary noise-added spectrums $\lambda(k, l)$ and outputs the calculated index values to the control unit 211. Accordingly, the index values indicating the degrees of distortion of the additional cumulative frequencies Lx are input to the control unit 211.

The control unit 211 estimates the speech recognition rate corresponding to the sets of the cumulative frequencies Lx (including the additional cumulative frequencies Lx) and the index values indicating the degrees of distortion corresponding to the cumulative frequencies Lx input from the distortion calculation unit 110 based on the speech recognition rate correlation information, and selects the cumulative frequency Lx in which the estimated speech recognition rate is the highest. The control unit 211 outputs the selected cumulative frequency Lx to the noise estimation unit 205 of the noise suppression unit 203. That is, the cumulative frequency Lx corresponding to the highest speech recognition rate estimated for at least two cumulative frequencies Lx is selected.

The control unit 211 estimates the addition amount corresponding to the set of the selected cumulative frequency Lx and the index value indicating the input degree of distortion based on the addition amount correlation information. This estimated addition amount is referred to as an estimated addition amount.

The control unit 211 selects the index value indicating the degree of distortion in which the speech recognition rate for the selected cumulative frequency Lx is the highest based on the speech recognition rate correlation information based on the speech recognition rate correlation information. The control unit 211 estimates the addition amount corresponding to the selected cumulative frequency Lx and the selected index value corresponding to the degree of distortion. This estimated addition amount is an ideal addition amount corresponding to the index value in which the speech recognition rate is the highest. The control unit 211 calculates a differential addition amount which is a difference between the estimated addition amount and the ideal addition amount and outputs the calculated differential addition amount to the amplitude adjustment unit 113. The amplitude adjustment unit 113 adds the differential addition amount to the current addition amount to update the addition amount. Accordingly, the amplitude adjustment unit 113 can control the addition amount in the amplitude adjustment unit 113 so as to maximize the speech recognition rate based on the selected cumulative frequency Lx. The control unit 211 outputs the addition amount updated by the amplitude adjustment unit 113 to the amplitude adjustment unit 213.

The noise suppression unit 203 includes a power calculation unit 204, a noise estimation unit 205, and a subtractor unit 206.

The power calculation unit 204 calculates a power spectrum $|Y(k, l)|^2$ based on a complex input spectrum $Y(k, l)$ input from the frequency domain transformation unit 102, similarly to the power calculation unit 104. The power calculation unit 204 outputs the calculated power spectrum $|Y(k, l)|^2$ to the noise estimation unit 205 and the subtractor unit 206.

The noise estimation unit 205 calculates a noise power $\lambda(k, l)$ included in the power spectrum $|Y(k, l)|^2$ input from the power calculation unit 204 based on the cumulative frequency Lx input from the control unit 211, similarly to the noise estimation unit 105. The noise estimation unit 205 outputs the calculated noise power $\lambda(k, l)$ to the subtractor unit 206.

The subtractor unit 206 calculates a complex noise-removed spectrum $X'(k, l)$ from which the noise component is removed by subtracting the noise power $\lambda(k, l)$ from the power spectrum $|Y(k, l)|^2$ input from the power calculation unit 204, similarly to the subtractor unit 106. The subtractor unit 206 outputs the calculated complex noise-removed spectrum $X'(k, l)$ to the time domain transformation unit 207.

The time domain transformation unit 207 transforms the complex noise-removed spectrum $X'(k, l)$ input from the subtractor unit 206 to a noise-removed signal $x'(t)$ in the time domain, similarly to the time domain transformation unit 107. The time domain transformation unit 207 outputs the transformed noise-removed signal $x'(t)$ to the adder unit 208.

The adder unit 208 generates an auxiliary noise-added signal $x(t)$ by summing (adding) the noise-removed signal $x'(t)$ input from the time domain transformation unit 207 and the auxiliary noise signal $w'(t)$ whose amplitude has been adjusted by the amplitude adjustment unit 213. The adder unit 208 outputs the generated auxiliary noise-added signal $x(t)$ to the speech recognition unit 114.

The amplitude adjustment unit 213 adjusts the amplitude of the auxiliary noise signal $w(t)$ input from the auxiliary noise generation unit 112 based on the addition amount input from the control unit 211, and outputs the auxiliary noise signal $w'(t)$ whose amplitude has been adjusted to the adder unit 208.

Therefore, the speech recognition unit 114 is supplied with the auxiliary noise-added signal $x(t)$ whose noise component has been suppressed based on the cumulative frequency Lx determined by the control unit 211 and to which the auxiliary noise signal $w'(t)$ is added based on the addition amount controlled by the control unit 211.

Figure 11:
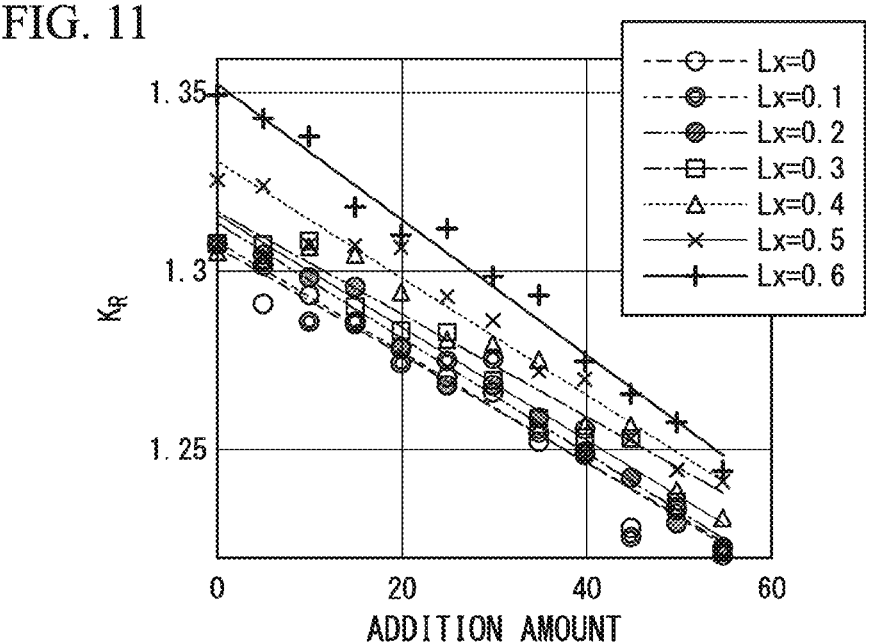
FIG. 11 is a diagram illustrating another example of the kurtosis ratio.

FIG. 11 is a diagram illustrating another example of the kurtosis ratio $K_R$.

In FIG. 11, the horizontal axis and the vertical axis are the same as in the example illustrated in FIG. 7. In the example illustrated in FIG. 11 or FIG. 12 to be mentioned later, a sound signal recorded when one person utters a speech under a circumstance in which music is added as noise is used.

In this example, as the addition amount increases, the kurtosis ratio $K_R$ linearly decreases. In the cumulative frequency Lx of 0 to 0.4, a significant difference is not observed in the relationship between the addition amount and the kurtosis ratio $K_R$ and it can be seen that the relationship hardly depends on the cumulative frequency Lx. Here, when the cumulative frequency Lx is greater than 0.5, a difference is generated in the relationship between the addition amount and the kurtosis ratio $K_R$. The kurtosis ratio $K_R$ illustrated in FIG. 11 has a larger value than illustrated in FIG. 7 as a whole and the kurtosis ratio $K_R$ varies depending on the recorded noise sources.

For example, addition amount correlation information indicating the relationship between the addition amount and the kurtosis ratio $K_R$ and the cumulative frequency Lx illustrated in FIG. 11 may be stored in the control unit 211. The addition amount correlation information may be information indicating the addition amount and a function of the kurtosis ratio $K_R$ and the cumulative frequency Lx. Accordingly, the dependency on the cumulative frequency Lx is further considered.

Figure 12:
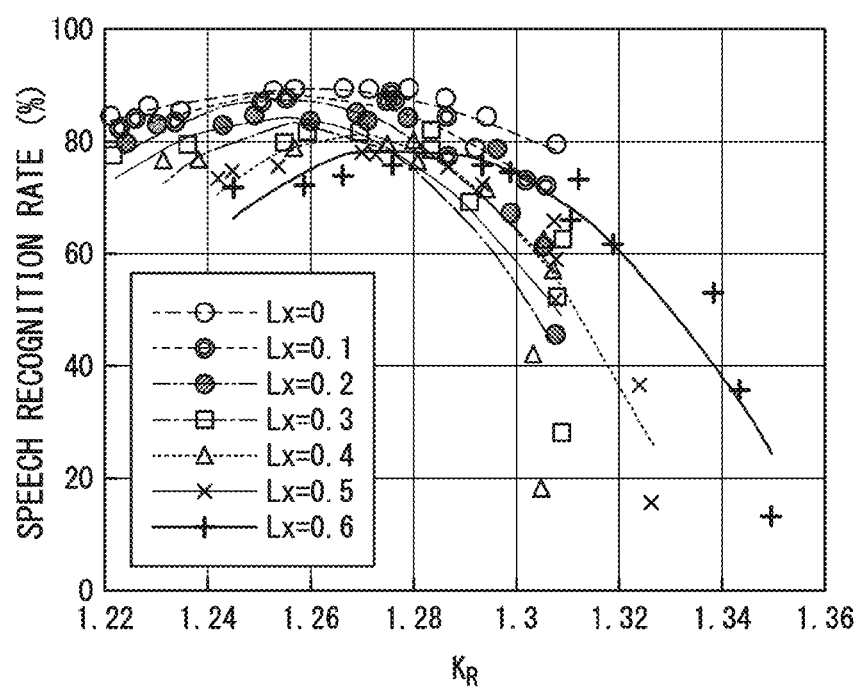
FIG. 12 is a diagram illustrating another example of the speech recognition rate.

FIG. 12 is a diagram illustrating another example of the speech recognition rate.

In FIG. 12, the horizontal axis and the vertical axis are the same as in the example illustrated in FIG. 8.

In this example, the kurtosis ratio $K_R$ in which the speech recognition rate is the highest is present. In the cumulative frequency Lx of 0 to 0.4, a significant difference based on the cumulative frequency Lx is not observed and the recognition rate is 85% which is the highest when the kurtosis ratio $K_R$ is about 1.26. Here, when the cumulative frequency Lx is greater than 0.5, a difference is generated in the relationship between the kurtosis ratio $K_R$ and the recognition rate. The recognition rate illustrated in FIG. 12 has a greater value than illustrated in FIG. 8 as a whole and the recognition rate varies depending on the recorded noise sources.

For example, speech recognition rate correlation information indicating the relationship between the recognition rate and the kurtosis ratio $K_R$ and the cumulative frequency Lx illustrated in FIG. 12 may be stored in the control unit 111. In the speech recognition rate correlation information, the speech recognition rate may be information indicating a function of the kurtosis ratio $K_R$ and the cumulative frequency Lx. Accordingly, the dependency on the cumulative frequency Lx is further considered.

A sound processing flow according to this embodiment will be described below.

Figure 13:
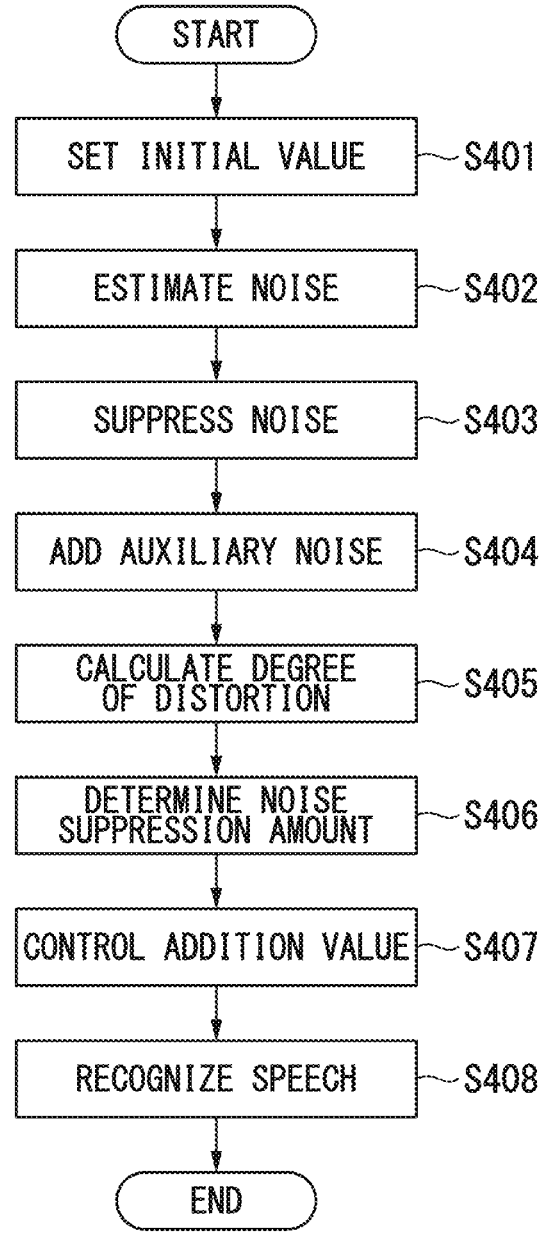
FIG. 13 is a flowchart illustrating a sound processing flow according to the second embodiment.

FIG. 13 is a flowchart illustrating a sound processing flow according to this embodiment.

(Step S401) The sound processing device 2 sets parameters used for the processing to predetermined initial values (initialization). Examples of such parameters include the cumulative frequency Lx when the noise estimation unit 105 uses the HRLE method and the addition amount in the amplitude adjustment unit 113. Thereafter, the process proceeds to step S402.

(Step S402) The noise estimation unit 105 calculates a noise power $\lambda(k, l)$ included in a power spectrum $|Y(k, l)|^2$ for each of at least two cumulative frequencies Lx input from the control unit 211, for example, using the HRLE method. Accordingly, the noise component for each cumulative frequency Lx is estimated. Thereafter, the process proceeds to step S403.

(Step S403) The subtractor unit 106 calculates a complex noise-removed spectrum X'(k, l) from which the noise component is removed by subtracting the noise powers $\lambda(k, l)$ from the power spectrums $|Y(k, l)|^2$, respectively. Accordingly, the noise component for each cumulative frequency Lx is suppressed. Thereafter, the process proceeds to step S404.

(Step S404) The adder unit 108 generates an auxiliary noise-added signal x(t) for each cumulative frequency Lx by adding an auxiliary noise signal w'(t) whose amplitude has been adjusted to a noise-removed signal x'(t) which is obtained by transforming the complex noise-removed spectrum X'(k, l) to the time domain. Thereafter, the process proceeds to step S405.

(Step S405) The distortion calculation unit 110 calculates, for example, the kurtosis ratio $K_R$ for each cumulative frequency Lx as the index value indicating the degree of distortion of the complex auxiliary noise-added spectrum $\lambda(k, l)$ which is obtained by transforming the auxiliary noise-added signal x(t) to the time domain. Thereafter, the process proceeds to step S406.

(Step S406) The control unit 211 estimates speech recognition rates corresponding to the sets of the cumulative frequency Lx and the index values indicating the degrees of distortion calculated based on the cumulative frequencies based on the speech recognition rate correlation information, and selects the cumulative frequency Lx in which the estimated speech recognition rate is the highest. The cumulative frequency Lx represents the suppression amount of the noise component and thus the noise suppression amount is determined. The control unit 211 outputs the selected cumulative frequency Lx to the noise estimation unit 205. Thereafter, the process proceeds to step S407.

(Step S407) The control unit 211 determines the addition amount so as to maximize the speech recognition rate based on the selected cumulative frequency Lx based on the speech recognition rate correlation information, and controls the addition amount in the amplitude adjustment unit 113 using the determined addition amount. The control unit 211 outputs the addition amount controlled by the amplitude adjustment unit 113 to the amplitude adjustment unit 213. Thereafter, the process proceeds to step S408.

(Step S408) The speech recognition unit 114 is supplied with the auxiliary noise-added signal x(t) whose noise component has been suppressed based on the cumulative frequency Lx determined by the control unit 211 and to which the auxiliary noise signal is added based on the addition amount controlled by the control unit 211. The speech recognition unit 114 performs a speech recognition process on the supplied auxiliary noise-added signal x(t) and recognizes speech details. Thereafter, the process flow ends.

As described above, in this embodiment, the speech recognition rate is estimated based on the degrees of distortion of the auxiliary noise-added signals generated by suppressing the noise component with at least two kinds of suppression amounts, the suppression amount in which the estimated speech recognition rate is the highest is selected, and the noise component is suppressed using the selected suppression amount. Accordingly, it is possible to reduce the influence of distortion due to the suppression of the noise component and thus to further enhance the speech recognition rate. In this embodiment, the addition amount of the auxiliary noise signal is controlled to maximize the speech recognition rate estimated on the selected suppression amount. Accordingly, the addition amount of the auxiliary noise signal is selected which alleviates the influence of distortion and which has a smaller influence to the speech recognition rate.

In the above-mentioned embodiment, a speech determination unit may be provided which is configured to determine whether a sound signal y(t) input from the sound input unit 101 is in a speech section or a non-speech section at predetermined time intervals. The speech determination unit supplies the speech recognition unit 114 with the auxiliary noise-added signal x(t) determined to be in the speech section, and does not supply the speech recognition unit 114 with the auxiliary noise-added signal x(t) determined to be in the non-speech section. The speech determination unit may supply the frequency domain transformation unit 102 with the sound signal y(t) determined to be in the speech section and may not supply the frequency domain transformation unit 102 with the sound signal y(t) determined to be in the non-speed section. Accordingly, since the speech recognition process is performed on only the speech section and is not performed on the non-speech section, it is possible to secure a high speech recognition rate.

The speech determination unit performs, for example, voice activity detection (VAD) on the sound signal y(t) for each sounded section. The sounded section is a section interposed between an ascent and a descent in amplitude of a sound signal. The ascent is a portion in which the power of a sound signal is greater than a predetermined power after a soundless section. The descent is a portion in which the power of a sound signal is smaller than a predetermined power before a soundless section.

The speech determination unit determines that a section is a speech section when the zero-crossing number for each time interval is greater than a predetermined number. The zero-crossing number means the number of times by which the amplitude value of a sound signal crosses zero, that is, the number of times by which the amplitude value is changed from a negative value to a positive value or from a positive value to a negative value.

An example is described above where the distortion calculation unit 110 calculates an index value indicating a degree of distortion at predetermined time intervals, the control unit 111 or 211 controls the addition amount of the auxiliary noise signal w(t), and the control unit 211 selects the suppression amount of the noise component. However, the above-mentioned embodiments are not limited to this example. In this embodiment, these processes may be skipped after the distortion calculation unit 110 calculates the index value indicating a degree of distortion time, the control unit 111 or 211 controls the addition amount of the auxiliary noise signal w(t), and the control unit 211 selects the suppression amount of the noise component at least once. That is, in the sound processing flow illustrated in FIG. 9, the processes of steps S305 and S306 may be skipped after the processes of steps S305 and S306 are performed at least once. In the sound processing flow illustrated in FIG. 13, the processes of steps S405, S406, and S407 may be skipped after the processes of steps S405, S406, and S407 are performed at least once. Accordingly, a processing load or a delay caused by the processes is reduced. When sound conditions such as the type of sound source (for example, a person), a reverberation time, and an amount of reverberation are constant or variations thereof are small, it is possible to maintain the speech recognition rate.

In the above-mentioned embodiments, the sound processing device 1 or 2 may include a sound condition determination unit (not illustrated) that determines ambient sound conditions, and the distortion calculation unit 110 may acquire an index value indicating a degree of distortion based on the sound conditions determined by the sound condition determination unit. Accordingly, the sequential performing of the process of causing the distortion calculation unit 110 to calculate the index value indicating a degree of distortion, the process of causing the control unit 111 or 211 to control the addition amount of the auxiliary noise signal w(t), and the process of causing the control unit 211 to select the suppression amount of the noise component can be skipped. Accordingly, it is possible to maintain the speech recognition rate and to reduce the processing load or the delay caused by the processes.

Here, the sound condition determination unit may receive an input of an image signal from an imaging unit that captures an ambient image and may determine the sound condition based on the input image signal. Here, the sound condition determination unit determines whether the surroundings are indoors or outdoors (that is, there is no reverberation) based on the image signal using an existing image recognition technique. When it is determined that the surroundings are indoors, the sound condition determination unit may determine space information such as the size of a surrounding space or a material of an inner wall using the existing image recognition technique and other image processing techniques and may calculate a reverberation time or an amount of reverberation based on the determined space information. The sound condition determination unit may recognize an person using the existing image recognition technique.

The sound condition determination unit may determine the sound conditions based on a sound signal input from the sound input unit 101. The sound condition determination unit may calculate a reverberation time and an amount of reverberation using an existing reverberation time estimation process or an existing reverberation estimation process. The sound condition determination unit may recognize a speaker using an existing speaker recognition process.

The distortion calculation unit 110 calculates an index value indicating a degree of distortion for each sound condition in advance. Therefore, the distortion calculation unit 110 includes a storage unit in which sound condition information in which the previously-calculated index values and the sound conditions are correlated with each other is stored in advance, and the sound condition determination unit may read the index value corresponding to the sound condition determined by the sound condition determination unit from the storage unit.

An example is described above where the control unit 111 or 211 uses the word recognition rate as the index value of the speech recognition rate, but a likelihood may be used instead of the word recognition rate. The likelihood is, for example, an index value indicating a statistical likelihood of a word as the recognition result. The value indicating the likelihood may be a real number in the linear domain or may be a real number in the logarithmic domain.

The control unit 111 or 211 may receive the auxiliary noise-added signal x(t) from the adder unit 108, may perform the same speech recognition process as in the speech recognition unit 114 on the input auxiliary noise-added signal x(t), and may acquire the likelihood in the course thereof.

The control unit 111 may change the addition amount of the auxiliary noise signal w'(t) and cause the amplitude adjustment unit 113 to adjust the amplitude of the auxiliary noise signal w'(t) so as to obtain the changed addition amount. The control unit 111 may determine the addition amount so as to maximize the likelihood obtained through the speech recognition process or may update the addition amount correlation information by correlating the index value of the degree of distortion input from the distortion calculation unit 110 with the likelihood for each addition amount.

The control unit 211 may change the set of the addition amount of the auxiliary noise signal w'(t) and the suppression amount (for example, the cumulative frequency Lx), may cause the amplitude adjustment unit 113 to adjust the amplitude of the auxiliary noise signal w'(t) so as to obtain the changed addition amount, and may control the suppression amount in the noise suppression unit 103 so as to obtain the changed suppression amount. The control unit 111 may determine the addition amount and the suppression amount so as to maximize the likelihood obtained through the speech recognition process and may update the speech recognition rate correlation information by correlating the index value of the degree of distortion input from the distortion calculation unit 110 with the likelihood for each addition amount and each suppression amount. Therefore, by using the likelihood as the index value of the speech recognition rate, the control unit 111 or 211 can estimate the speech recognition rate on-line or can update the addition amount correlation information and the speech recognition rate correlation information. Accordingly, the speech recognition rate is enhanced over the entire system.

In the above-mentioned embodiments, the sound input unit 101 may record sound signals of multiple channels and may output the sound signal of at least one channel out of the multiple channels to the frequency domain transformation unit 102. The sound processing device 1 or 2 may include a sound source separation unit that separates components of at least two sound sources emanating from different directions to sound signals of different channels by components from the sound signals of multiple channels recorded by the sound input unit 101. The sound source separation unit estimates directions of the sound sources using a known sound source localization technique such as a multiple signal classification (MUSIC) method. The sound source separation unit acquires sound signals indicating the components of the sound sources from the sound signals of multiple channels recorded by the sound input unit 101 using directional filters having directivities of the estimated directions. The sound source separation unit outputs the sound signal of at least one channel out of the acquired sound signals to the frequency domain transformation unit 102.

When the sound signal of at least one channel out of the sound signals is data expressed in the frequency domain, the sound input unit 101 or the sound source separation unit may output the data to the noise suppression unit 103.

In the above-mentioned embodiments, the speech recognition unit 114 and the control unit 111 or 211 may perform a speech recognition process using a missing feature mask (MFM). The speech recognition process using the MFM is also referred to as a missing feature theory-automatic speech recognition (MFT-ASR) process. The MFM is a mask that reduces an influence of an unreliable component of a distorted speech.

In the above-mentioned embodiments, the distortion calculation unit 110 calculates an index value indicating a degree of distortion for each predetermined frequency band. The speech recognition unit 114 and the control unit 111 or 211 calculate the MFM so that the larger the index value indicating a degree of distortion in a frequency band becomes, the smaller the influence of the index value becomes. The speech recognition unit 114 and the control unit 111 or 211 weight likelihoods corresponding to sound feature amounts using the calculated MFM for each frequency band and determines a recognition result (for example, a phoneme) in which the weighted likelihood is the highest. Accordingly, the larger the degree of distortion of a component in a frequency band becomes, the smaller the influence of a sound feature amount of the component becomes, thereby enhancing the speech recognition rate.

The speech recognition process flow using the MFM includes, for example, the following processes (a) to (i).

(a) An auxiliary noise-added signal x(t) is transformed to a complex noise-removed spectrum X'(k, l) in the frequency domain. In this embodiment, the complex noise-removed spectrum X'(k, l) may be input from the frequency domain transformation unit 109 instead of performing this process.

(b) A complex spectrum Y(k, l) of an input signal y(t) is input from the frequency domain transformation unit 102.

(c) A noise power λ(k, l) is input from the noise suppression units 105 and 205.

(d) A confidence m(f, l) is calculated, for example, using Expression (6) based on the complex spectrum Y(k, l), the complex noise-removed spectrum X'(k, l), and the noise power λ(k, l) for each predetermined frequency band, for example, for each mel-frequency band f.

$$m(f,l)=S_{in}(f,l)/(S_{out}(f,l)+B(f,l)) \quad (6)$$

In Expression (6), $S_{in}(f, l)$ and $S_{out}(f, l)$ represent an input energy value and an output energy value in frame l and band f, respectively. The input energy value $S_{in}(f, l)$ is a square sum of the complex spectrums Y(k, l). The output energy value $S_{out}(f, l)$ is a square sum of the complex noise-removed spectrums X'(k, l). B(f, l) represents a noise energy value in frame l and band f. The noise energy value B(f, l) is the total sum of the noise powers λ(k, l).

When a distortion such as musical noise is not generated in the noise suppression process, $S_{out}(f, l)+B(f, l)$ is equal to the value obtained by adding the energy value of the auxiliary noise signal to $S_{in}(f, l)$. Therefore, when noise is not suppressed and auxiliary noise is not added, the confidence m(f, l) is 1. When a distortion is generated, $S_{out}(f, l)+B(f, l)$ is a larger value than the value obtained by adding the energy value of the auxiliary noise signal to $S_{in}(f, l)$ and thus the confidence m(f, l) becomes a value smaller than 1 and closer to 0.

Therefore, the confidence m(f, l) is an index value indicating a degree of degradation due to the addition of the auxiliary noise signal or the distortion, and has a maximum value of 1 and a minimum value of 0.

(e) The index value indicating the degree of distortion, for example, the kurtosis ratio $K_R$, is input from the distortion calculation unit 110 for each band f.

(f) A threshold value T of the MFM, to be described later, is calculated based on the index value indicating the degree of distortion. Here, the threshold value T is calculated so that the larger the index value indicating the degree of distortion becomes, the larger the threshold value T becomes. For example, the threshold value T is calculated using a linear function $T=cK_R+d$ of the kurtosis ratio $K_R$. Here, c and d are predetermined real numbers.

(g) The MFM M(f, l) is calculated based on the confidence m(f, l) and the kurtosis ratio $K_R$ for each band f. In the above-mentioned embodiments, a hard mask (hard MFM) may be used as the MFM or a soft mask (soft MFM) may be used. M(f, l)=0 is obtained when the hard mask is used and the confidence m(f, l) is less than the threshold value T, and M(f, l)=1 is obtained when the confidence m(f, l) is equal to the threshold value T or greater than the threshold value T.

When the soft mask is used and the confidence m(f, l) is less than the threshold value T, M(f, l) is 0. When the confidence m(f, l) is equal to the threshold value T or greater than the threshold value T, M(f, l) is a function monotonously increasing with the confidence m(f, l) and having a minimum value of 0 and a maximum value of 1, for example, a sigmoid function expressed by Expression (7).

$$M(f,l) = \frac{1}{1+\exp(-\sigma(m(f,k)-T))} \quad (7)$$

In Expression (7), σ represents a slope value indicating a variation of M(f, l) with respect to a variation of m(f, l). σ is a predetermined real number greater than 0. That is, M(f, l) represents a weight given so as not to consider the influence of the component in a band f when the confidence m(f, l) is less than the threshold value T and to increase the influence of the component in the band f when the confidence m(f, l) is greater than the threshold value T. Therefore, the larger the kurtosis ratio $K_R$ becomes, the smaller the MFM becomes.

(h) For each band f, a sound feature amount ξ, for example, the MSLS and the delta MSLS, of the auxiliary noise-added signal x(t) is calculated.

(i) A state S, for example, a likelihood L(ξ|S) of a phoneme model, when the sound feature amount ξ is given is calculated, for example, using Expression (8).

$$L(\xi|S) = \sum_f M(f,l)L(\xi(f)|S) \quad (8)$$

In Expression (8), L(ξ(f)|S) represents a likelihood of a state S when the sound feature amount ξ(f) in the band f is given. Therefore, Expression (8) represents that the likelihood L(ξ|S) is calculated by weighting the likelihood L(ξ(f)|S) with the MFM M(f, l) for each band f.

The confidence m(f, l) and the threshold value T are calculated for each band f in the above-mentioned processes of (a) to (d) and (f) and the MFM M(f, l) is calculated based on the relationship between the confidence m(f, l) and the threshold value T in the process of (g), but the above-mentioned embodiments are not limited to this example. In a band in which the index value indicating the degree of distortion becomes larger, the MFM M(f, l) has only to become smaller as the index of the magnitude of influence of the component in the band. In an example where the hard mask is used, M(f, l)=1 may be set when the threshold value T calculated in the process of (i) is less than a predetermined threshold value $T_0$, and M(f, l)=0 may be set when the threshold value T is equal to the threshold value $T_0$ or greater than the threshold value $T_0$. Here, the threshold value $T_0$ is a constant. In an example where the soft mask is used, M(f, l) is 0 when the threshold value T is greater than the threshold value $T_0$. When the threshold value T is less than the threshold value $T_0$, M(f, l) may be a function monotonously decreasing with an increase of the threshold value T and having a minimum value of 0 and a maximum value of 1, for example, a sigmoid function expressed by Expression (9).

$$M(f, l) = \frac{1}{1 + \exp(-\sigma(T_0 - T))} \quad (9)$$

When this example is used, the above-mentioned processes (a) to (d) and (g) may be skipped.

Parts of the sound processing device 1 or 2 in the above-mentioned embodiments, for example, the frequency domain transformation unit 102 or 109, the noise suppression unit 103 or 203, the time domain transformation unit 107 or 207, the adder unit 108 or 208, the distortion calculation unit 110, the control unit 111 or 211, the auxiliary noise generation unit 112, the amplitude adjustment unit 113 or 213, and the speech recognition unit 114, may be embodied by a computer. In this case, the parts of the sound processing device may be embodied by recording a program for performing the control function on a computer-readable recording medium and reading and executing the program recorded on the recording medium into a computer system. Here, the "computer system" is a computer system built in the sound processing device 1 or 2 and is assumed to include an OS or hardware such as peripherals. Examples of the "computer-readable recording medium" include portable mediums such as a flexible disk, a magneto-optical disk, a ROM, and a CD-ROM and a storage device such as a hard disk built in a computer system.

The "computer-readable recording medium" may include a medium that dynamically holds a program for a short time like a communication line when a program is transmitted via a network such as the Internet or a communication circuit such as a telephone circuit or a medium that holds a program for a predetermined time like a volatile memory in a computer system serving as a server or a client in that case. The program may be configured to realize a part of the above-mentioned functions or may be configured to realize the above-mentioned functions by combination with a program recorded in advance in a computer system.

All or a part of the sound processing device 1 or 2 according to the above-mentioned embodiments may be embodied by an integrated circuit such as a large scale integration (LSI) circuit. The functional blocks of the sound processing device 1 or 2 may be individually incorporated into processors, or a part or all thereof may be integrated and incorporated into a processor. The integration circuit technique is not limited to the LSI, but may be embodied by a dedicated circuit or a general-purpose processor. When an integration circuit technique appears as a substituent of the LSI with advancement in semiconductor technology, an integrated circuit based on the technique may be used.

While exemplary embodiments of the invention have been described and illustrated above in detail, the specific configurations are not limited to the above-mentioned configurations but can be modified in design in various forms without departing from the gist of the invention.

What is claimed is:

1. A sound processing device, comprising:
at least one processor; and
at least one memory including computer program code,
wherein the at least one memory and the computer program code are configured to, with the at least on processor, cause the sound processing device to
suppress a noise component included in an input sound signal,
add auxiliary noise to the input sound signal, whose noise component has been suppressed by the noise suppression unit, to generate an auxiliary noise-added signal,
calculate a degree of distortion of the auxiliary noise-added signal,
estimate a speech recognition rate corresponding to the degree of distortion,
calculate a kurtosis ratio which is a ratio of a kurtosis of the auxiliary noise-added signal to a kurtosis of the input sound signal as the degree of distortion,
determine an addition amount based on the kurtosis ratio as an index value indicating the degree of distortion,
calculate a power spectrum based on the noise component,
calculate a complex noise-removed spectrum by subtracting the noise power from the power spectrum,
transform the complex noise-removed spectrum into the input sound signal whose noise component has been suppressed,
calculate a differential addition amount which is a difference between the determined addition amount and an ideal addition amount in which the speech recognition rate is the highest,
control the addition amount, by which the auxiliary noise is added to the input sound signal whose noise component has been suppressed to maximize a speech recognition rate based on the kurtosis ratio, by using the differential addition amount, and
perform a speech recognition process on the auxiliary noise-added signal.

2. The sound processing device according to claim 1, wherein the at least one memory and the computer program code are further configured to, with the at least on processor, cause the sound processing device to estimate the speech recognition rate based on the degree of distortion of the auxiliary noise-added signal generated by suppressing the noise component with at least two types of suppression amounts, to select the suppression amount with which the estimated speech recognition rate is maximized, and to cause the noise suppression unit to suppress the noise component with the selected suppression amount.

3. The sound processing device according to claim 2, wherein the at least one memory and the computer program code are further configured to, with the at least on processor, cause the sound processing device to control the addition amount of the auxiliary noise so as to maximize the estimated speech recognition rate with the selected suppression amount.

4. The sound processing device according to claim 1, wherein the at least one memory and the computer program code are further configured to, with the at least on processor, cause the sound processing device to
calculate the degree of distortion for each component of the auxiliary noise-added signal, and
perform the speech recognition process so that the larger the degree of distortion of a component becomes, the smaller an influence of the component becomes.

5. A sound processing method, comprising:
detecting a noise component included in an input sound signal and suppressing the noise component detected from the input sound signal;
adding auxiliary noise to the input sound signal, whose noise component has been suppressed in the noise suppression step, to generate an auxiliary noise-added signal;
calculating a degree of distortion of the auxiliary noise-added signal;
estimating a speech recognition rate corresponding to the degree of distortion;
calculating a kurtosis ratio which is a ratio of a kurtosis of the auxiliary noise-added signal to a kurtosis of the input sound signal as the degree of distortion;
determining an addition amount based on the kurtosis ratio as an index value indicating the degree of distortion;
calculating a power spectrum based on the noise component;
calculating a complex noise-removed spectrum by subtracting the noise power from the power spectrum;
transforming the complex noise-removed spectrum into the input sound signal whose noise component has been suppressed;
calculating a differential addition amount which is a difference between the determined addition amount and an ideal addition amount in which the speech recognition rate is the highest;
controlling the addition amount, by which the auxiliary noise is added to the input sound signal whose noise component has been suppressed to maximize a speech recognition rate based on the kurtosis ratio, by using the differential addition amount; and
performing a speech recognition process on the auxiliary noise-added signal.

* * * * *